United States Patent
Farrett

(10) Patent No.: US 7,689,543 B2
(45) Date of Patent: Mar. 30, 2010

(54) SEARCH ENGINE PROVIDING MATCH AND ALTERNATIVE ANSWERS USING CUMULATIVE PROBABILITY VALUES

(75) Inventor: Peter W. Farrett, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1281 days.

(21) Appl. No.: 10/798,508

(22) Filed: Mar. 11, 2004

(65) Prior Publication Data

US 2005/0203883 A1  Sep. 15, 2005

(51) Int. Cl.
*G06F 17/30* (2006.01)
(52) U.S. Cl. .................... 707/3; 707/4; 707/5
(58) Field of Classification Search ............ 707/3, 707/4, 5, 6
See application file for complete search history.

(56) References Cited

U.S. PATENT DOCUMENTS

| | | | |
|---|---|---|---|
| 5,377,103 A | 12/1994 | Lamberti et al. | |
| 5,634,051 A | 5/1997 | Thomson | |
| 5,659,731 A * | 8/1997 | Gustafson | 707/4 |
| 5,717,914 A | 2/1998 | Husick et al. | |
| 5,778,157 A | 7/1998 | Oatman et al. | |
| 5,933,827 A | 8/1999 | Cole et al. | |
| 5,970,499 A | 10/1999 | Smith et al. | |
| 5,995,955 A | 11/1999 | Oatman et al. | |
| 6,006,225 A * | 12/1999 | Bowman et al. | 707/5 |
| 6,009,459 A | 12/1999 | Belfiore et al. | |
| 6,029,165 A | 2/2000 | Gable | |
| 6,078,914 A | 6/2000 | Redfern | |
| 6,086,617 A | 7/2000 | Waldon et al. | |
| 6,108,686 A | 8/2000 | Williams, Jr. | |
| 6,167,370 A | 12/2000 | Tsourikov et al. | |
| 6,192,354 B1 | 2/2001 | Bigus et al. | |
| 6,199,081 B1 | 3/2001 | Meyerzon et al. | |
| 6,212,518 B1 | 4/2001 | Yoshida et al. | |
| 6,778,975 B1 * | 8/2004 | Anick et al. | 707/1 |
| 6,963,867 B2 * | 11/2005 | Ford et al. | 707/3 |
| 6,993,516 B2 * | 1/2006 | Haas et al. | 707/2 |
| 2001/0049677 A1 * | 12/2001 | Talib et al. | 707/3 |
| 2002/0165848 A1 * | 11/2002 | Rautenbach et al. | 707/1 |
| 2003/0014399 A1 * | 1/2003 | Hansen et al. | 707/3 |
| 2003/0018615 A1 * | 1/2003 | Chaudhuri et al. | 707/1 |
| 2004/0002964 A1 * | 1/2004 | Kobayashi et al. | 707/3 |
| 2004/0162834 A1 * | 8/2004 | Aono et al. | 707/100 |
| 2004/0167897 A1 * | 8/2004 | Kuhlmann et al. | 707/10 |
| 2004/0260534 A1 * | 12/2004 | Pak et al. | 704/7 |

* cited by examiner

*Primary Examiner*—Pierre M Vital
*Assistant Examiner*—Christopher J Raab
(74) *Attorney, Agent, or Firm*—Douglas Lashmit; Hoffman Warnick LLC

(57) ABSTRACT

A system and method for searching a knowledge base for a match answer and an alternative answer. The method includes the steps of: inputting a search term; beginning a search at a random location in the knowledge base to identify the match answer; determining a match answer category from the match answer; determining a look-up association based on the match answer category and a search history; plugging the look-up association into an alternative answer probability table to identify an alternative answer category; and performing a secondary search at a second random location in the knowledge base to find the alternative answer that belongs to the alternative answer category.

15 Claims, 4 Drawing Sheets

| Association / Sum | (1) Marketing | (2) Products | (3) Contacts | (4) Other |
|---|---|---|---|---|
| 1-1  sum = 2 | 1 | | 1 | |
| 1-2  sum = 1 | 1 | | | |
| 1-3  sum = 0 | | | | |
| 1-4  sum = 3 | | 2 | | 1 |
| 2-1  sum = 0 | | | | |
| 2-2  sum = 1 | | 1 | | |
| 2-3  sum = 0 | | | | |
| 2-4  sum = 4 | 2 | | 3 | 1 |
| 3-1  sum = 6 | | 1 | | 3 |
| 3-2  sum = 0 | | | | |
| 3-3  sum = 1 | | | 1 | |
| 3-4  sum = 2 | | 2 | | |
| 4-1  sum = 0 | | | | |
| 4-2  sum = 1 | | | 1 | |
| 4-3  sum = 2 | 2 | | | |
| 4-4  sum = 1 | | | 1 | |

FIG. 3

| Association | (1) Marketing | (2) Products | (3) Contacts | (4) Other |
|---|---|---|---|---|
| 1-1 | 1/2 | | 1/2 | |
| 1-2 | 1/1 | | | |
| 1-3 | | | | |
| 1-4 | | 2/3 | | 1/3 |
| 2-1 | | 1/1 | | |
| 2-2 | | | | |
| 2-3 | | | | |
| 2-4 | 2/6 | | 3/4 | 1/4 |
| 3-1 | | 1/6 | | 3/6 |
| 3-2 | | | | |
| 3-3 | | 2/2 | 1/1 | |
| 3-4 | | | | |
| 4-1 | | | | |
| 4-2 | 2/2 | | 2/2 | |
| 4-3 | | | | |
| 4-4 | | | 1/1 | |

FIG. 4

SEARCH ENGINE PROVIDING MATCH AND ALTERNATIVE ANSWERS USING CUMULATIVE PROBABILITY VALUES

BACKGROUND OF THE INVENTION

1. Technical Field

The present invention relates generally to search engines, and more particularly, to a search engine for a knowledge base that is capable of determining a match answer and an alternative answer based on a history record of cumulative probability values.

2. Related Art

Conventional search engines are located on a server side of a client-server environment. As a result, application of these search engines relative to knowledge bases that are located client-side is very difficult. For example, a knowledge base loaded to a portable digital assistant is incapable of searching unless communicable with a server-side search engine. Even if the client-side is readily communicable with the server-side search engine, processing delays such as database or application server requests (from client to server) affect performance. Performance problems are generally related to the Javascript or Perl front-end loaded nature of conventional server side systems and their related back-end DB2 or Oracle servers.

Conventional search-engines also do not address locating exact information that a user requests since they apply very complex layers of software abstraction, e.g. the Berkley search engine strategy and artificial intelligence algorithms. Other disadvantages of conventional search engines are their inability to learn from prior searches for a user relative to a given knowledge base. That is, they do not readily provide user preferences relative to a knowledge base.

In view of the foregoing, there is a need in the art for a search engine that is client-side, high performance and learns user preferences.

SUMMARY OF THE INVENTION

The invention provides a search system and method that may be implemented in a client-side environment, provides high performance and creates user preferences relative to a knowledge base. The search system may also be natural language based. In addition, it is applicable to a variety of knowledge bases and can be adapted to other applications such as on-line help, interactive training, wizard functions, virtual chat sessions, intelligent bots, etc.

In a first aspect, the invention provides a method for searching a knowledge base having a plurality of answer objects for a match answer and an alternative answer, comprising: inputting a search term; beginning a search at a random location in the knowledge base to identify the match answer; determining a match answer category from the match answer; determining a look-up association based on the match answer category and a search history; plugging the look-up association into an alternative answer probability table to identify an alternative answer category; and performing a secondary search at a second random location in the knowledge base to find the alternative answer that belongs to the alternative answer category.

In a second aspect, the invention provides a user preference search system for searching a knowledge base to find a match answer and an alternative answer for a search term, comprising: a search engine that performs a first search at a first location in the knowledge base and returns a match answer, and performs a second search at a second location in the knowledge base to find an alternative answer, wherein the alternative answer belongs to an alternative answer category determined by plugging a look-up association into an alternative answer probability table; and a table update system that updates the alternative answer probability table based on a table of previously determined category answer associations.

In a third aspect, the invention provides a program product stored on a recordable medium for searching a knowledge base for a match answer and an alternative answer, comprising: means for inputting a search term; means for beginning a search at a random location in the knowledge base to identify the match answer; means for selecting a match answer category from the match answer; means for determining a look-up association based on the match answer category and a search history; means for plugging the look-up association into an alternative answer probability table to identify an alternative answer category; and means for performing a secondary search at a second random location in the knowledge base to find the alternative answer that belongs to the alternative answer category.

The foregoing and other features of the invention will be apparent from the following more particular description of embodiments of the invention.

BRIEF DESCRIPTION OF THE DRAWINGS

The embodiments of this invention will be described in detail, with reference to the following figures, wherein like designations denote like elements, and wherein:

FIG. 3 shows a history table in accordance with the present invention.

FIG. 4 shows an alternative answer probability table in accordance with the present invention.

DETAILED DESCRIPTION OF THE INVENTION

Figure 1:
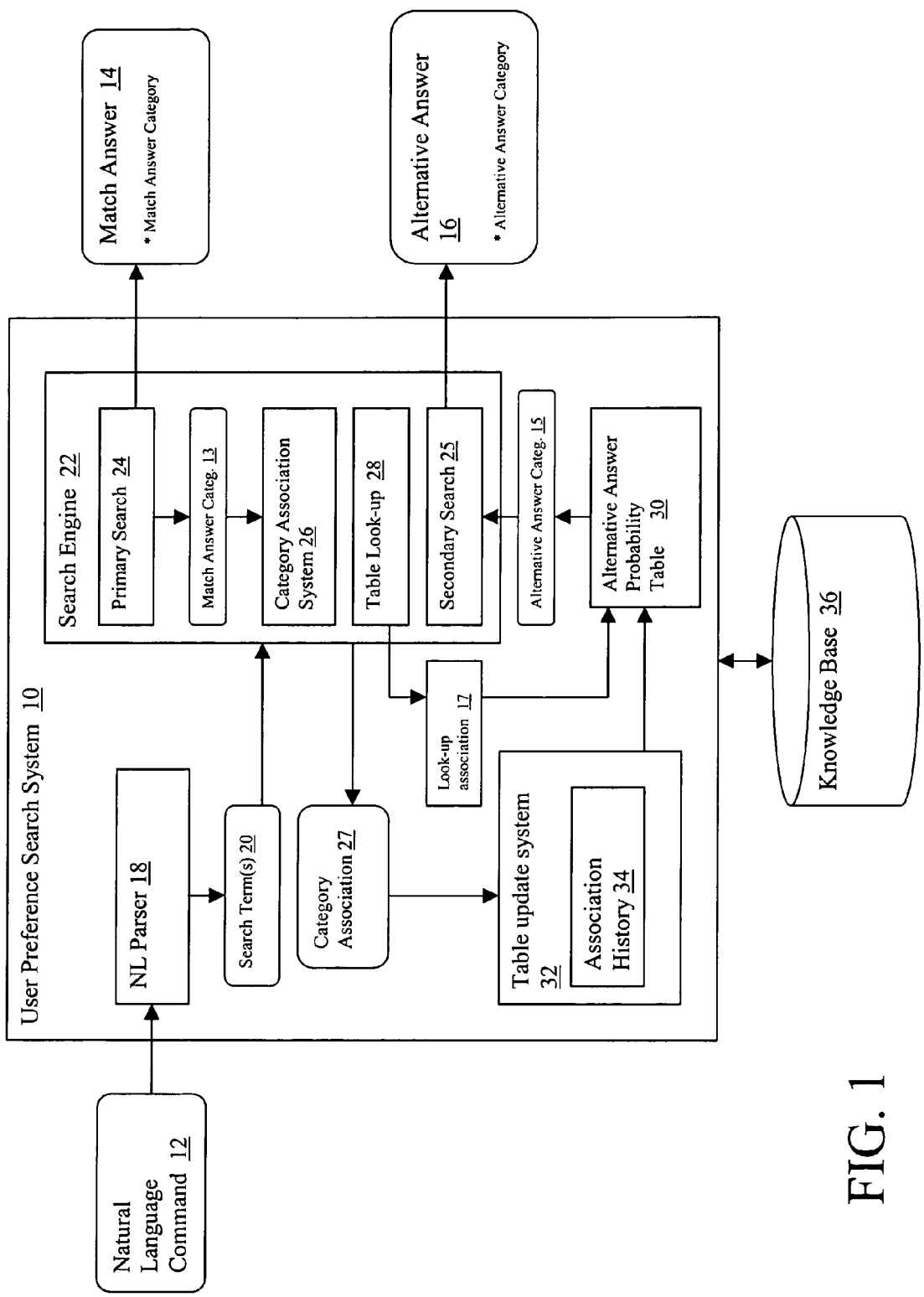
FIG. 1 shows a block diagram of a user preference search system in accordance with the present invention.

With reference to the accompanying drawings, FIG. 1 depicts a block diagram of a user preference search system 10 that searches knowledge base 36 in response to a search input string, i.e., natural language (NL) command 12 and outputs a match answer 14 and an alternative answer 16. Search system 10 may be implemented in any type of computer system that, for instance, includes memory, a processing unit, a computer program, input/output devices (I/O), etc. Knowledge base(s) 36 may be provided as part of search system 10 or separately. The features of search system 10 may be implemented as a program product that include: (1) a natural language (NL) parser 18 that receives the NL command 12 and generates one or more search terms 20; (2) a search engine 22 that receives a search term 20 and generates a match answer 14 based on a primary search 24 and an alternative answer 16 based a table look-up 28 and secondary search 25; and (3) a table update system 32 that maintains/updates a history table 34 and an alternative answer probability table 30.

In the example described herein, search system 10 may be provided on a client-side of operations with knowledge base 36 loaded to system 10. An association history table 34 of user preferences, specific to knowledge base 36, is utilized to generate search results. However, it should be noted that search system 10 could be configured to operate with a plurality of knowledge bases, each having an associated history table 34. The natural language format makes the system 10 user friendly, and could be readily adapted to other applications, such as on-line help, interactive training, wizard functions, virtual chat sessions, intelligent bots, etc.

Searching

Figure 2:
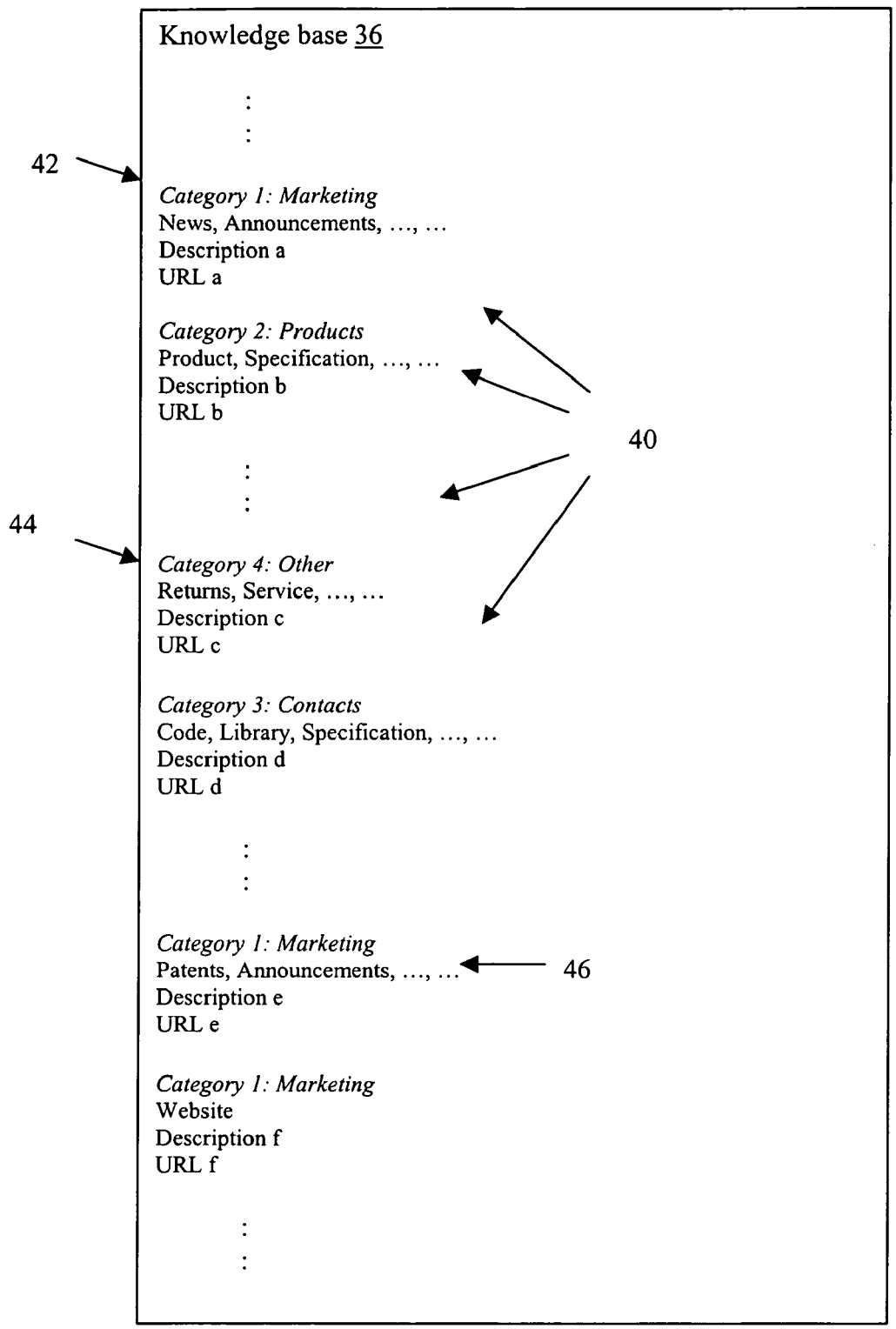
FIG. 2 shows organization of a knowledge base in accordance with the present invention.

Knowledge base 36 comprises a database of possible "answer objects" 40, as shown in FIG. 2. Each answer object 40 generally includes, e.g., a category, one or more target words 46, a description, and a URL. Exemplary entries of knowledge base 36 are shown in FIG. 2. When a search term 20 matches one of the target words 46, a hit occurs, and an answer (e.g., the URL, category and description) can be returned to the user. Often, a target word 46 may appear in many different answer objects 40, so there may be many potential answers to an inputted search term 20. The present invention seeks to limit the number of answers generated by search engine 22 to two answers, a match answer 14 and an alternative answer 16 based on recorded user preferences.

To achieve this, search engine 22 includes a primary search 24 that initiates a search at a random location 42 in the knowledge base 36. When a first answer object 40 containing the search term 20 is identified, a match answer 14 is outputted. Next, an alternative answer category 15 for alternative answer 16 is selected using category association system 26 and table look-up 28. Once the alternative answer category 15 is selected, a secondary search 25 occurs beginning at a second random location 44 in the knowledge base 36. The secondary search 25 searches for the search term 20 only in answer objects 40 that belong to the alternative answer category 15. When a hit occurs, the alternative answer 16 is output. In the exemplary embodiments described herein, answer objects 40 belong to one of four categories labeled as Marketing, Products, Contacts, and Other. However, it should be recognized that any number of categories and/or labels could be used without departing from the scope of the invention.

Identifying an alternative answer category 15 after the match answer 14 is found is accomplished in a two-step process as follows. First, category association system 26 determines a look-up association 17 for the match answer 14. For instance, if the match answer 14 belonged to "category 1:Marketing," then category association system 26 would determine the best association, such as "category 2:Products" resulting in a "1-2" look-up association.

Once determined, table look-up 28 plugs the look-up association 17 into alternative answer probability table 30 to determine the alternative answer category 15. FIG. 4 depicts an example of an alternative answer probability table 30. As can be seen for the case of look-up association 1-2, category 1:Marketing has a 100% (1/1) probability of occurring, and therefore would be selected as the alternative answer category 15. For the case of look-up association 2-4, category 3:Contacts has a 75% (3/4) probability of occurring and category 4:Other has a 25% (1/4) chance of occurring. Therefore in this case, category 3:Contacts would be selected as the alternative answer category 15. The process of building alternative answer probability table 30 is described below.

As noted, in order to access alternative answer probability table 30, a look-up association 17 must be inputted. A look-up association 17 can be determined in any manner. In one exemplary embodiment, look-up associations are determined from a history table 34, such as that shown in FIG. 3. As can be seen in the left most column, all category association possibilities are provided, e.g., 1-1, 1-2, . . . 4-3, 4-4. To determine the appropriate look-up association 17 for the category 13 of the match answer 14, the sum of all entries for each association are examined, and the highest sum is used as the association. For instance, if the match answer 16 was in category 2:Products, then the look-up association 17 would be 2-4, since that association has the highest sum value, sum=4, of 2-1, 2-2, 2-3 and 2-4. As will be described below, the history table 34 is maintained by table update system 32, which is then used to generate alternative answer probability table 30.

In summary, the first step is to begin a search at a random location in the knowledge base 36 to identify a match answer 14. Once the match answer 14 is found, a look-up association 17 is determined from history table 34 based on the match answer category 13. Next, the look-up association 17 is plugged into the alternative answer probability table 30 to identify an alternative answer category 15. Once the alternative answer category 15 is identified, as secondary search 25 is performed beginning at a second random location 44 in the knowledge base 36, which finds the next occurrence of the search term 20 belonging to the alternative answer category 15.

Table Updating

Whenever a user inputs a search, preference information is extracted and stored in history table 34, such as that shown in FIG. 3. Specifically, a category association 27 comprising the match answer category 13 and the alternative answer category 15 (i.e., 1-1, 1-2, . . . , etc., shown along the y axis) is incremented for the match answer category 13 (shown x axis). Thus, for example, if the match answer 14 belonged to category 1 Marketing and the alternative answer 16 belonged to category 2:Products, then the cell 1-2 under Marketing would be incremented. If the match answer 14 belonged to category 3:Contacts and the alternative answer 16 belonged to category 1:Marketing, then the cell 3-1 under Contacts would be incremented. Because the process is repeated for each search, history table 34 becomes more and more robust. The sums of each row can be maintained and updated as shown in FIG. 3.

From the history table 34, alternative answer probability table 30 can be formed by examining the cells in each row, and apportioning a probability to the cells. For example, as shown in the first row (i.e., 1-1) of FIG. 3, the Marketing and Contacts category cells each have a value of 1. Accordingly, each of these two cells are apportioned a probability of 1/2 (i.e., 50%), as shown in FIG. 4.

It is understood that the various devices, modules, mechanisms and systems described herein may be realized in hardware, software, or a combination of hardware and software, and may be compartmentalized other than as shown. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after the following: (a) conversion to another language, code or notation; and/or (b) reproduction in a different material form.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

The invention claimed is:

1. A computerized method for searching a knowledge base database having a plurality of answer objects for a match answer and an alternative answer and providing the match answer and alternative answer, comprising:
    inputting a search term;
    beginning a search at a random location in the knowledge base to identify the match answer;
    outputting the match answer;
    determining a match answer category from the match answer;
    determining a look-up association based on the match answer category and a search history table;
    inputting the look-up association into an alternative answer probability table to identify an alternative answer category;
    performing a secondary search at a second random location in the knowledge base to find the alternative answer that only belongs to the alternative answer category; and
    outputting the alternative answer.

2. The method of claim 1, wherein the match answer category and the alternative answer category form a category answer association, and the search history table comprises previously determined category answer associations.

3. The method of claim 2, wherein the alternative answer probability table is determined from the search history table.

4. The method of claim 1, wherein the search term is extracted from a natural language input.

5. The method of claim 1, wherein the match answer and alternative answer are presented in a natural language format.

6. A user preference search system for searching a knowledge base to find a match answer and an alternative answer for a search term, comprising:
    a search engine stored on a computer system, comprising a processing unit, that performs a first search at a first location in the knowledge base and returns a match answer, and performs a second search at a second location in the knowledge base to find an alternative answer, wherein the alternative answer belongs to an alternative answer category determined by inputting a look-up association into an alternative answer probability table, wherein the look-up association is based on a search history table; and
    a table update system that updates the alternative answer probability table based on a table of previously determined category answer associations.

7. The user preference search system of claim 6, wherein the first and second locations are determined randomly.

8. The user preference search system of claim 6, wherein the look-up association is determined from a search history.

9. The user preference search system of claim 7, wherein each previously determined category answer association comprises a match answer category and an alternative answer category.

10. The user preference search system of claim 6, further comprising a natural language parser for receiving natural language commands and generating the search term.

11. A program product stored on a recordable medium for searching a knowledge base database for and providing a match answer and an alternative answer, comprising:
    means for inputting a search term;
    means for beginning a search at a random location in the knowledge base to identify the match answer;
    means for outputting the match answer;
    means for selecting a match answer category from the match answer;
    means for determining a look-up association based on the match answer category and a search history table;
    means for inputting the look-up association into an alternative answer probability table to identify an alternative answer category;
    means for performing a secondary search at a second random location in the knowledge base to find the alternative answer that only belongs to the alternative answer category; and
    means for outputting the alternative answer.

12. The program product of claim 11, wherein the match answer category and the alternative answer category form a category answer association, and the search history table comprises previously determined category answer associations.

13. The program product of claim 11, wherein the alternative answer probability table is determined from the search history table.

14. The program product of claim 11, wherein the search term is extracted from a natural language input.

15. The program product of claim 11, wherein the match answer and alternative answer are presented in a natural language format.

* * * * *